Nov. 29, 1960   J. BAUER   2,961,884
AUTOMATIC CONTROL MEANS FOR A GEAR TRANSMISSION
Filed May 28, 1958   5 Sheets-Sheet 3

INVENTOR
Johannes Bauer
By Beaman & Beaman
attys

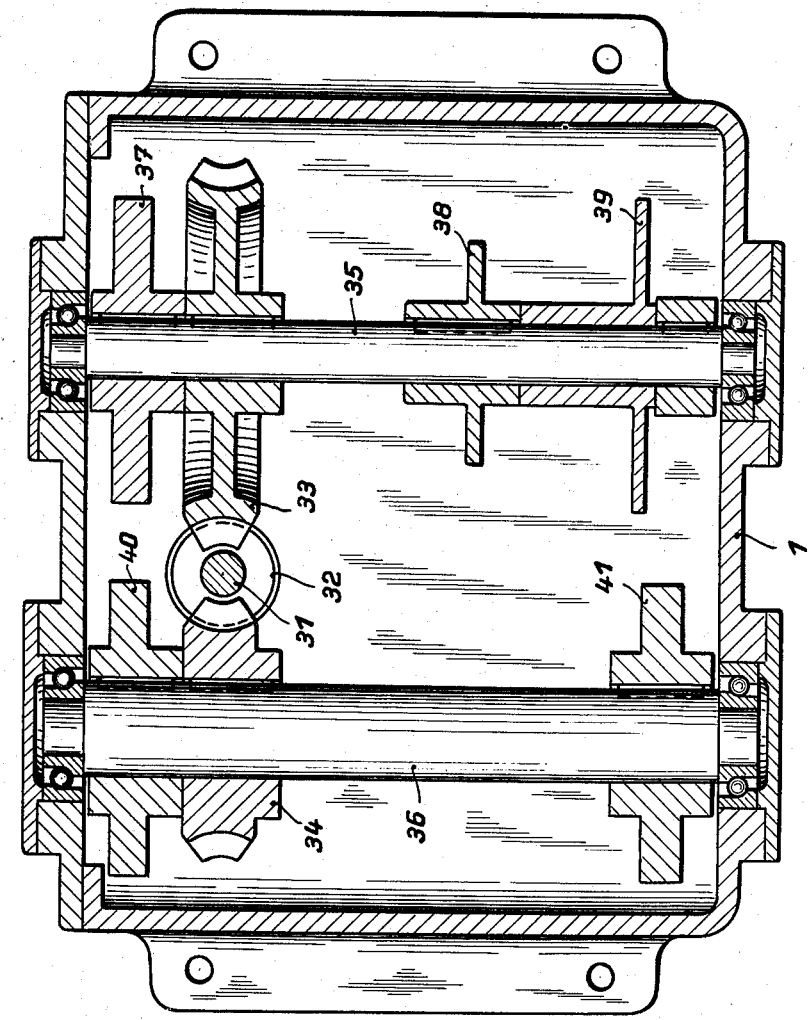

United States Patent Office 2,961,884
Patented Nov. 29, 1960

2,961,884
AUTOMATIC CONTROL MEANS FOR A GEAR TRANSMISSION

Johannes Bauer, Lindenstrasse 25a, Itzehoe, Germany

Filed May 28, 1958, Ser. No. 738,413

Claims priority, application Germany May 29, 1957

11 Claims. (Cl. 74—336.5)

The invention relates to automatic control means for a gear transmission, and in particular pertains to a regulator for a vehicle automatic transmission gear box.

Automatic gear changing means are already known on power driven vehicles. These known automatically operating gear changers work electrically or in most cases hydraulically. They have not heretofore been able to be widely used because they are expensive to manufacture and require considerable space and expenditure and because they require larger engines than manually shifted transmissions.

In the majority of present day power driven vehicles therefore the gear change is effected by hand.

One object of the invention is therefore to provide a simple automatic gear changing mechanism which is easy and non-expensive to manufacture.

Another object of the invention is to provide an automatic gear changing mechanism having a small energy consumption.

Yet another object of the invention is to provide an automatic gear changing mechanism which is adapted to be mounted in existing motor driven vehicles.

The invention deals with the problem of providing a device which effects automatic gear change without the disadvantage of known devices having this purpose and which above all is suitable because of its compact and simple construction as auxiliary equipment for insertion into existing vehicles without a great deal of constructional alterations being necessary.

This problem is solved in accordance with the invention by the displaceable arrangement of a reversing means provided with a drive coupling in connection with an output member which controls the direction of displacement in dependence on the turning direction of the reversing means.

According to a preferred embodiment of the invention the output member is a worm by means of which the control cams are driven.

According to a specially preferred embodiment of the invention the reversing means is displaceable corresponding to the driving speed by the reaction force of its reversing means in dependence on operating or stop discs which are movable by the output member.

The operating and stop discs are advantageously arranged on the same shaft as the control cams. By limitation of the displacement of the reversing means and thus the operating member in dependence on the gear position, the driven device is provided with an abutment which permits the driven device to set the shaft carrying the control cam in motion. In this way provision is made to prevent operation of the control cam shaft beyond the limits of a step gear and to secure each gear position within the necessary limits between the individual positions.

This separation into two shafts has the advantage that repeated movement can be effected by the same cam and thus a small dimension of the cam is possible. A control cam for carrying out the gear change is so built that the roller running thereon is in a low position for the first gear so that it can be changed from this position to the reverse position by hand in that the roller can be lifted from the cam.

In this kind of automatic device it is also essential to prevent an automatic additional change of the device in particular situations. For example during passing the speed of a vehicle can be so increased that the speed range appropriate to a gear is exceeded. It is then inexpedient to change into the next gear. The invention provides in connection with these circumstances an engageable stop device, which stops the regulation and thus prevents an automatic gear change. This stop device is coupled with the accelerator of the vehicle in a particularly advantageous embodiment and becomes effective when the driver depresses the accelerator to the full extent.

Further advantages and characteristics of the invention will appear from the following description of an illustrative embodiment thereof which is represented in the drawings. In the drawings:

Figure 10 is a sectional view of the device taken along line X—X of Fig. 2.

Figure 1:
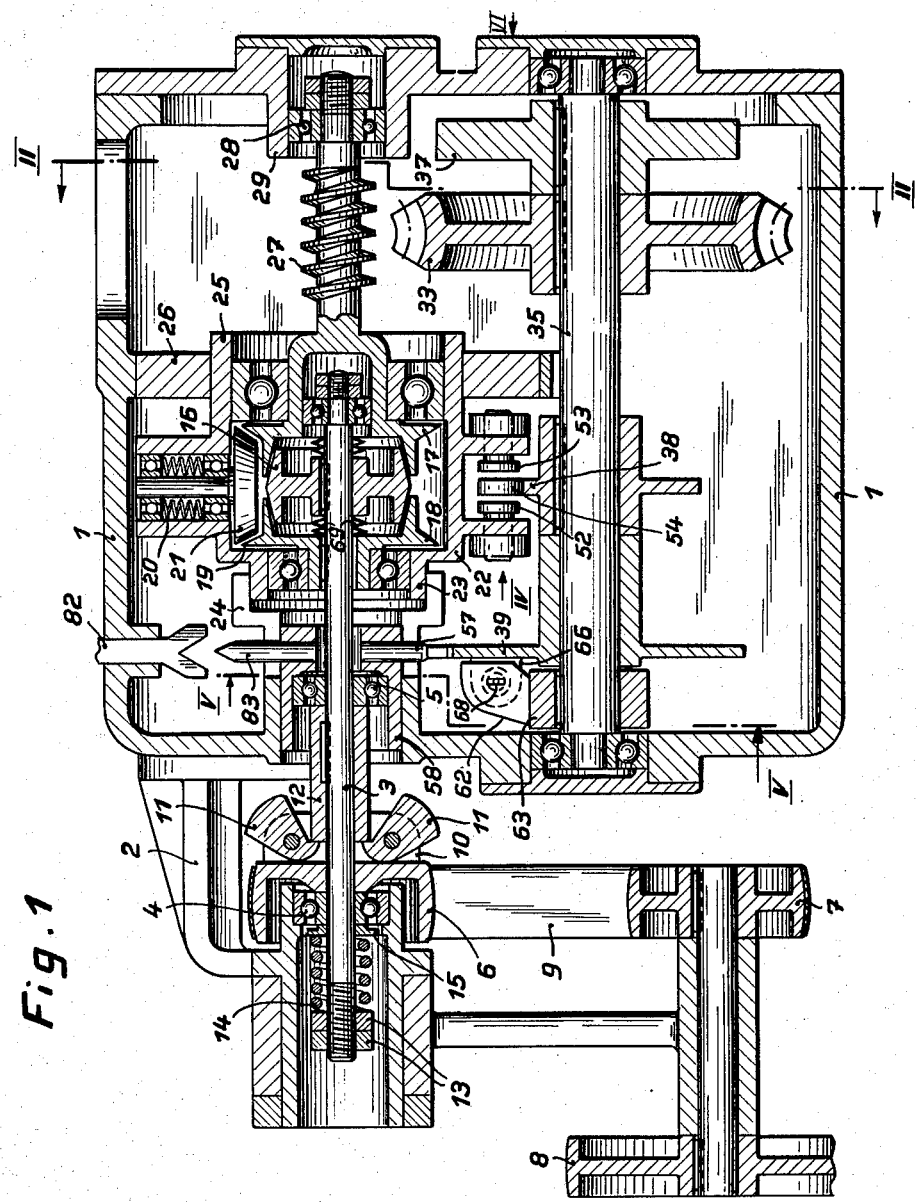
Figure 1 is a sectional side view of the device along the line I—I of Figure 2, some parts in Figure 2 being omitted however.

Reference is made first to Figure 1. The essential parts of the device are arranged within a housing 1. Integral with this housing is a support member 2 in which a shaft 3 is supported for axial displacement in ball bearings 4 and 5. On the shaft 3 a belt pulley 6 is arranged for rotation therewith but for axial displacement thereto, so as to abut the ball bearing 4 so that its position with reference to the housing is maintained. This belt pulley 6 co-operates with a pulley 7 which is driven by a friction wheel 8. The friction wheel 8 is in a driving connection with a motor. This motor not shown is adapted to drive a motor vehicle in a conventional manner by way of a clutch and a transmission. The clutch may be in the form of a frictional coupling and is provided between the motor and the transmission which has three or four forward speeds and one reverse speed. The transmission may be of any conventional construction and is especially constructed in the form of a mechanical sliding or shifting gear change-over drive. The belt pulleys 6 and 7 are connected together by a belt 9.

On the belt pulley 6 is a projection 10 on which centrifugal weights 11 can pivot radially of the shaft 3. The weights 11 are provided with abutments at their ends by means of which a bush 12 mounted on the shaft 3 can be engaged so that the shaft 3 is urged towards the right as shown on Figure 1 with increasing speed. Stop members not shown are provided to limit the throw of the centrifugal weights in both directions of their rotational movement.

Also on the shaft 3 is an abutment formed by nuts 13 for a spring 14, the other end of which bears on an abutment ring 15. The spring 14 acts to oppose axial displacement of the shaft 3 by the centrifugal weights 11.

Also on the shaft 3 is a clutch disc 16 having two working surfaces opposed to one another. On displacement of the shaft 3, this disc is urged into engagement with either a counter disc 17 or a counter disc 18 of a reversing device generally designated by 19. These two counter discs 17, 18 are rotatably supported in a housing 22 encompassing all the parts of the reversing device 19.

The discs 17 and 18 of this reversing device are additionally provided with circumferential conically shaped frictional surfaces which are engaged by three (see also Figure 3) friction discs 21 each urged against these two frictional surfaces by springs 20 arranged in the housing 22 so that the counter discs 17 and 18 rotate in opposite directions. The shafts of the friction discs 21 are journalled in the housing 22 of the reversing device by means of ball bearings.

The housing 22 of the reversing device is displaceable in the axial direction of the shaft 3 within the housing 1. For this purpose the housing 22 is provided on the one side with a projection 23 which is displaceably mounted in a hub 24 of the housing 1 while the housing 22 has on its other side a hub-like support 25 which is received by a corresponding bore of a ring-like wall 26 of the housing 1.

A worm 27 coaxial with the disc 17 is rigidly connected thereto by means of a worm shaft. This worm serves as an output member for the reversing device and is axially displaceable together with the housing 22 of the reversing device 19. Correspondingly the end support 28 of the worm shaft is displaceably arranged in a hub 29 of the housing 1.

Figure 2:
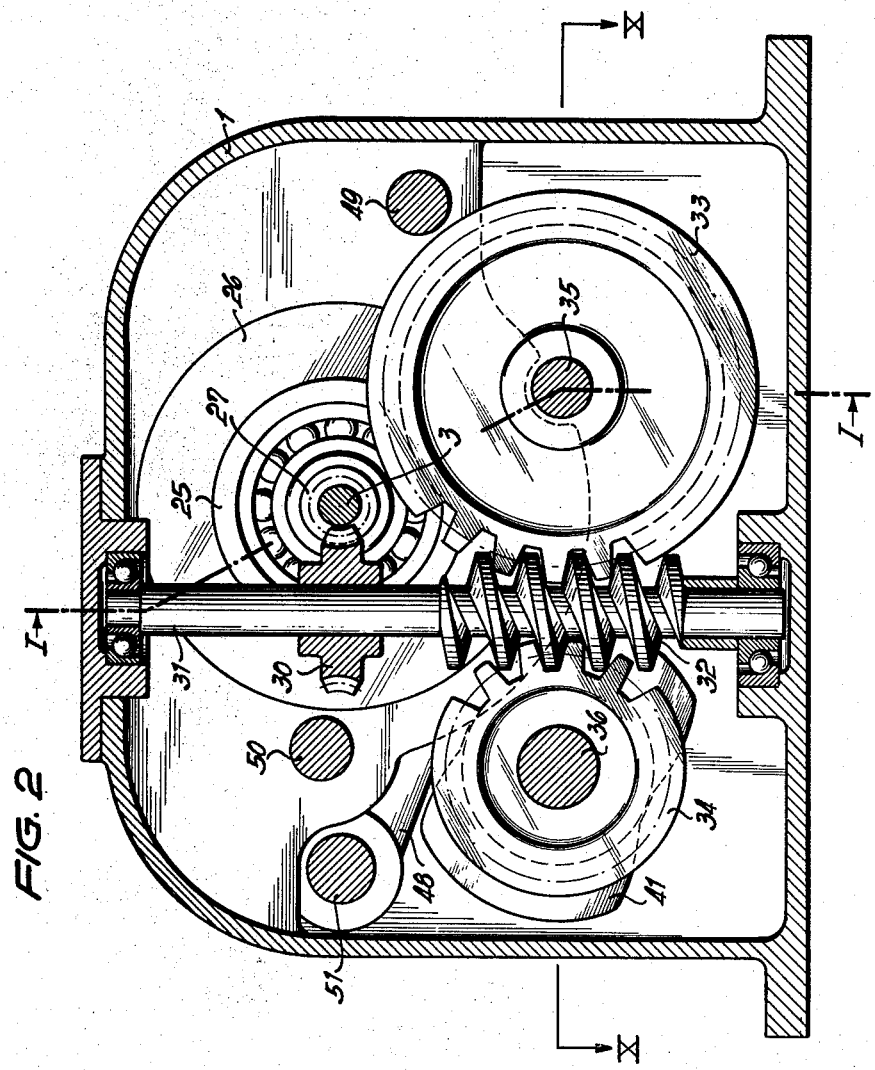
Figure 2 is a section through the device corresponding to the line II—II of Figure 1.

The worm 27, due to its engagement with other driving members and depending on its turning direction has the tendency to axially displace the reversing device 19 and the housing 22 thereof either to the left or right in the representation of Fig. 1. After an axial movement of this kind is limited when an abutment is reached, the worm 27 rotates a worm wheel 30 (Fig. 2) with which it is in engagement and therefore a worm shaft 31, the worm 32 and the worm wheels 33 and 34.

The worm wheel 33 is fastened on a shaft 35 and the worm wheel 34 is fastened on a shaft 36. Both shafts are rotatably supported in housing 1 and are arranged in parallel relation with respect to each other and to shaft 3 and worm 27. Also on the shaft 35 is arranged a cam disc 37 as well as an abutment disc 38 and a stop disc 39. On the shaft 36 are likewise arranged two cam discs 40 and 41.

The device is so laid out in its arrangement and in the chosen transfer to the shafts 35 and 36, that the shaft 35 during a complete gear change for example from the first to the fourth position of a transmission having four forward speeds undergoes rotational movement through less than a complete revolution. The magnitude of the rotation can be ascertained from the length of arrow 42 drawn round about shaft 35 of Fig. 5. The shaft 36 on the contrary during a complete change from the first to the fourth position makes one and a half rotations, so that for each single stop half a rotation takes place. Here it should be noted that the engagement of the first speed when starting the vehicle is done by the driver and that thereafter an automatic shifting of the transmission will be performed. The control cam 37 on shaft 35 and the control cams 40 and 41 on shaft 36 are shown individually in Figures 5 to 7. The control cams are provided as profiled discs on which spring urged rollers 43, 44, 45 respectively run which move levers 46, 47 and 48 respectively in dependency of the disc profile. These levers 46, 47, 48 are fastened on shafts 49, 50, 51 respectively. Control cams 37 and 40 are provided for effecting the gear changing of the transmission while control cam 41 is provided for actuating the vehicle clutch arranged between the vehicle motor and the transmission in the usual manner. The shifting of the forward speeds of the transmission is being effected in the usual manner in two paths parallel one to another (see Fig. 9 and the explanations connected therewith later on). The one or the other end of each path corresponds to one special speed of the transmission so that these two paths provide four forward speeds. The movement of the usual gear shifting lever along these two paths is controlled by control cam 40. Furthermore the usual transmission gears are provided with a third path which lies angularly and especially perpendicularly with respect to the said two parallel paths and which serves to shift the gear from the speeds of the one parallel path to the speeds of the other parallel path. This third path is controlled by control cam 37.

Control cam 41 serves to control the engaging and disengaging of the vehicle clutch and in dependence thereon of the accelerator. The accelerator pedal is of course depressed by the driver in conformity with the desired velocity of the vehicle. Apart therefrom the fact that the fuel supply to the vehicle motor should be diminished during the disengagement of the vehicle or gear coupling for making sure that the motor will not race during shifting must be considered. Therefore control cam 41 controls not only the vehicle or gear clutch but also the fuel supply valve in such a way that the fuel supply will be diminished irrespective of the position of the accelerator pedal when the clutch is being disengaged, and vice versa. The transmission from the shafts 49, 50, 51 to the actuating levers of the change-over gear, the vehicle coupling and the fuel throttle valve can be effected by means of levers and links as well as through clutches or other transfer means well known in the art.

Before the form of the cams is individually considered, the method of operation of the device will be described.

The shaft 3 is displaced axially backwards or forwards in dependence on the pivoting of the centrifugal weights 11 corresponding to the velocity of the vehicle motor. In this way the clutch disc 16 is brought into engagement with either the disc 17 or the disc 18 so that one of these discs is rotated thereby. In this way worm 27 will be either directly rotated in one direction by means of counter disc 17 or indirectly in the opposite direction by the intermediary of counter disc 18 and frictional wheels 21. This rotational movement likewise produces displacement of the worm 27 in an axial direction either to the left or to the right as shown on Figure 1 because of the fact that initially the worm wheel 30 and all parts connected therewith are held stationary. The arrangement is such that the worm co-operates with the sense of rotation of the discs 17, 18 so that the longitudinal movement of the worm 27 takes place in a direction to seek to withdraw the clutch disc 16 from engagement with the disc 17 or 18. When a clutch engagement between the disc 16 and the disc 17 occurs the consequent drive of the worm 27 effects a movement of the reversing device 19 towards the right in Fig. 1. If, however, disc 16 engages counterdisc 18 the consequent-drive of the worm 27 effects an axial displacement of the reversing device 19 towards the left in Fig. 1.

A drive to the control cams 37, 40 and 41 and therefore a speed charging operation would now take place if the axial movement of the reversing device 19 would be stopped. For the purpose of stopping it the housing 22 of the reversing device 19 is provided with projections 52, 53 which co-operate with an abutment disc 38 fastened on shaft 35. These two projections 52, 53 are arranged on opposite sides of the abutment disc 38 which is provided with a recess 54 adapted to receive projection 52 or 53 (see Fig. 3 where projection 52 is omitted). In the starting position projection 53 is engaged by the recess 54 of abutment disc 38. This position corresponds to the beginning of circle 42, which lies perpendicularly under roller 43 of Fig. 5. The end of this circle 42 is defined by projection 52 so that the two projections 52, 53 are angularly displaced one with respect to another by an angle which equals the difference between 360° and the angle of circle 42 of Fig. 5.

Let us now assume an axial displacement of the reversing device 19 corresponding to an accelerating of the vehicle motor which runs on the first speed of the transmission (the first speed has been engaged by the driver, and the vehicle drives slowly).

Initially projection 53 will be drawn out of recess 54, and thereafter projection 52 abuts against the left hand surface (Fig. 1) of abutment disc 38 so that the axial movement of reversing device 19 and worm 27 are stopped. From this time the turning movement of the worm 27 is transferred to the worm wheel 30 and the worm 32. Consequently the shafts 35 and 36 are driven through the gears 33 and 34, and consequently the control cams 37, 40, 41 and also the abutment disc 38 and the stop disc 39 are rotated so that a gear shifting operation is inaugurated. Hereby shaft 35 will be rotated in a clockwise direction as in Fig. 3.

Recess 54 of the abutment disc 38 together with projections 52, 53 ensure that a further gear change operation of the device from the first speed to neutral or from the last, e.g. fourth gear is rendered impossible. To this end the abutment recess 54 of disc 38 is provided into which either the projection 52 or 53 can project according to the position of the shifting device. Due to the axial movement of the worm 27 either one of the discs 17 or 18 of the reversing device 19 may be retracted from the clutch disc 16 without individually effecting a gear change operation because the device is correspondingly arranged with reference to the regulation of the displacement of shaft 3 produced by the centrifugal weights 11. For this purpose the above mentioned stop members are provided for limiting the pivotal movement of the centrifugal weights 11 to either direction. As soon as the centrifugal weights are urged in one or the other direction of these stop members the drive of worm gear 27—30 is interrupted.

Figure 3:
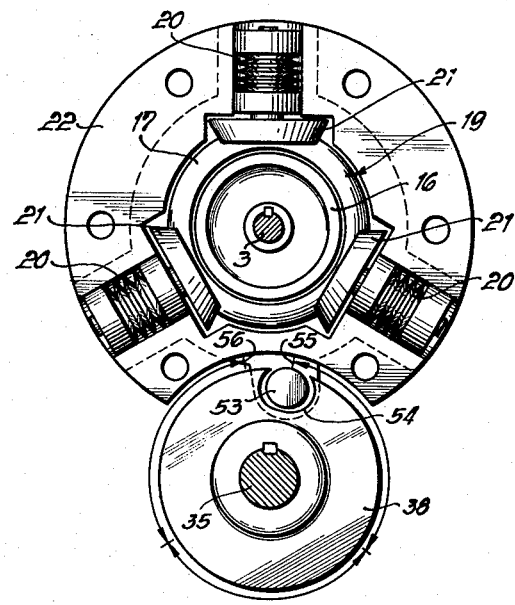
Figure 3 is a front view of the reversing means seen in the direction of the arrow III in Figure 1.

As mentioned above, the projections 52, 53 are spaced in correspondence to the end positions of the abutment disc 38. In Figure 3 the end positions of the recess 54 in the abutment disc 38 are designated by 55 and 56. The projections 52 and 53 are likewise angularly displaced in correspondence with these end positions.

Commencing from a position in the first gear speed with decreasing revolutions the worm 27 is moved to the left whereby the projection 53 is then able to enter the recess 54. If however the speed of the shaft 3 increases and if the shaft 3 is displaced to the right and the clutch disc 16 engages with the counter disc 17 then the worm 27 moves the housing 22 with the abutment 52 to the abutment disc 38. Because the projection 52 is spaced angularly from the projection 53 the projection 52 abuts on the abutment disc 38 so that a further movement of the worm toward the right is prevented. Consequently the worm drives the gear wheel which it is engaging and moves the shafts 35 and 36 and the control cams 37, 40, 41 and also the abutment disc 38 and the stop disc 39 are moved. Consequently the abutment disc 38 is moved in such a direction that the recess 54 is withdrawn or moved away from the projection 52.

It is essential that the clutch disc 16 remains in engagement with the disc 17 during the gear changing operation in order to insure complete shifting. For this purpose a stop device is provided which is effective during each gear change and the stop device includes stop disc 39. The other part of this stop device includes a catch 57 which is arranged in a housing 58 which is displaceable in the axial direction together with the shaft 3.

Recesses 59, 60, 61 and 59', are provided in the stop disc 39, corresponding to the individual step or speed change positions, in which the catch 57 can engage. The recesses 59 and 59' which correspond to the disc position in the region of the first and fourth speed gears are so arranged that they correspond radially to the position of the stop disc 39 with the circumferential points 55 and 56 on the abutment disc 38 (see Fig. 3) which are embodied by projections 52, 53.

Figure 4:
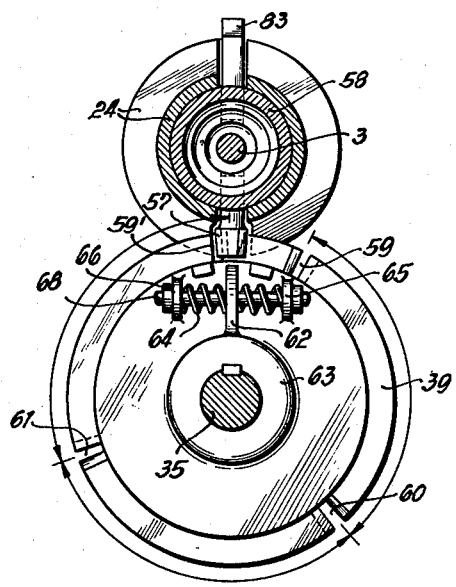
Figure 4 is a part section through Figure 1 corresponding to the line IV—IV in Figure 1, seen in the direction of the arrow III.

The stop disc 39 is spring mounted on the shaft 35 so that it can turn to a small extent and afterwards return to its original position. For this purpose a hub 63 is affixed to the shaft 35 and is provided with a finger 62 (see Figs. 1 and 4). The stop disc 39 is freely rotatable on the shaft 35 and engages the finger 62 through springs 64 and 65 which engage abutments 66 and 67 on the stop disc 39 at their other ends. A rod 68 is provided for supporting the springs 64, 65 which projects through a radially directed slot in the finger 62 of the stop disc 39.

The recesses 59, 60, 61 and 59' in the stop disc 39 have flanks oblique to the axis of the shaft 35. Moreover the catch 57 is provided with correspondingly formed flanks. When this catch consequently engages in a recess in the stop disc 39, the stop disc 39 can escape due to the thrust of the oblique flanks to one side, until the catch 57 is so far displaced that the stop disc 39 can spring back. In this way the coupling disc 16 is locked in its position, i.e. the discs 16 and 17 remain coupled, because after the locking the effect of the regulator with the centrifugal weights 11 and the spring 14 is rendered inoperative.

In this way both the stop disc 39 and the control cams 37, 40, 41 continue their rotation in the direction of the position corresponding to the gear shift from the first to the second gear speed. In this connection it is to be understood that the recess 60 in the stop disc 39 allotted to the second gear lies before the operating surfaces of control cams so that the recess becomes effective before a gear change. If the speed while the catch 57 approaches the recess 60 has changed such that a further gear change into the third gear is not necessary, then the catch 57 enters into the recess 61 of the stop disc 39 and this movement is assisted by the tensioning of the spring 14. Due to this movement, the clutch disc 16 is withdrawn from the disc 17 and engaged with the disc 18 so that a braking occurs because the reversing device 19 is not released before the worm 27 is turning in an opposite direction. Thus it is apparent that because of the extremely small play between the clutch disc 16 and the discs 17, 18 respectively a braking effect is immediately obtained which ensures a preparedness for quick successive gear shifts.

If in this case the regulation due to centrifugal weights 11 do not have sufficient force to draw the coupling discs 16 into engagement with the discs 18, 17 and to brake these, the worm 27 as well as the cams 37, 40, 41 continue under their inertia. Also the stop disc 39 is then still further turned and draws the catch 57 with the sloping edges of its recess and therefore also the shaft 3 with its clutch disc 16 against the disc 18 of the reversing device 19 so that braking occurs. After the standstill of the worm 27 a further axial displacement begins as above described.

The second gear is not correlated to an end position of the device, therefore if the parts of the device are positioned correspondingly both projections 52 and 53 may abut on the abutment disc 38. Thus the catch 57 can be locked with the stop disc 39 from either side whereby an unlocking takes place under the action of either the spring 14 or the centrifugal weights 11. Thus either a left or a right hand rotation of the worm 27 and the control cams can be effected. Thus the possibility is provided of changing either to third gear or back to the first gear. If for example the speed of the motor and, therefore, of the shaft 3 increases then the described gear change from the first to the second gear is continued in that now the gear changes from second to third. During this action, the catch 57 remains in the recess 60 of the stop disc 39 until the catch 57 in consequence of the higher speed of the shaft 3 and the movements related therewith is locked on the right hand side of the stop disc 39 and the coupling discs 16, 17 remain engaged until third gear is coupled.

If on reaching the shift position corresponding to the coincidence of the catch 57 with the recess 59' in the stop disc 39, the revolution of the shaft 3 is too great to permit a release of the catch 57 into the recess 59' of the stop disc 39, in that the centrifugal weights 11 urge the shaft 3 further to the right, then the reversing device is released in consequence of the fact that the projection 52 can engage in the recess 54 of the stop disc 38 which now lies before it. Thus the worm 27 keeps on turning with respect to the teeth of the worm wheel 30 however without rotating the worm wheel but displacing it and thus the housing 22 until the throw of the weights 11 is limited by a stop member not shown and the momentum of the worm urges the clutch disc 16 to the disc 18 and thus brings about a braking effect. This braking effect ceases when the worm 27 comes to a stop, so that an adjustment according to the speed of the shaft 3 takes place and a coupling of the device only for shifting back from fourth to third gear can take place. At this time the catch 57 slides to the left side of the stop disc 39 until it engages in the recess 61. From this position the device can shift back to second gear or on further into the fourth gear.

The rotation of the control cams 37, 40 and 41 depends on the catch 57 being locked with the disc 39 and the projections 52, 53, which co-operate with the abutment disc 39 cannot fully withdraw in that they pass through the recess 54. In order to simplify the relative adjustment of the abutments, the clutch disc 16 is mounted on the shaft 3 for displacement in the axial direction, i.e. in the direction towards the discs 18 and 17 and is urged towards the middle position by springs 69 which are mounted on both sides of clutch disc 16 and which act one against another. The other ends of these springs 69 may bear against projections or rings provided on shaft 3.

Figure 8:
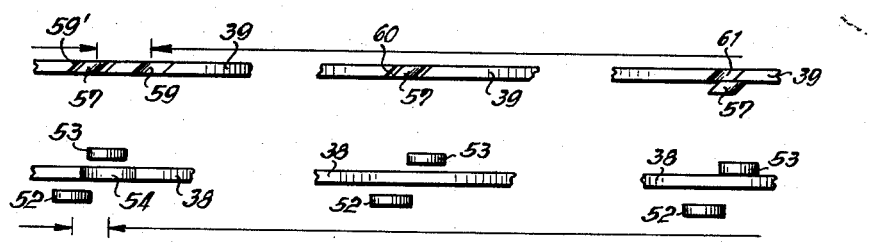
Figure 8 is a development of the stop disc shown in Figure 4 and the abutment disc is shown in Figure 3 for explaining their relative settings.

The gear shifting operation is easily understandable in connection with the above description and also from Figure 8, as this figure illustrates developments of the stop disc 39 with the catch 57 in relation to the abutment disc 38 with the projections 52 and 53.

Figure 5:
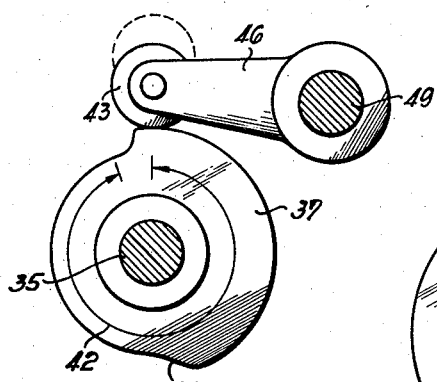
Figure 5 is a side view through a control cam for gear change seen in the direction of the arrow V in Figure 1.
Figure 7:
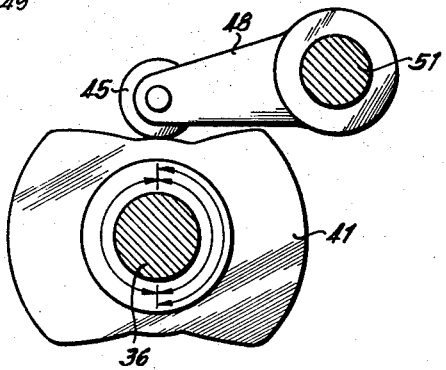
Figure 7 is a side view of a control cam for operating the clutch of the vehicle and the accelerator seen in the direction of the arrow III in Figure 1.
Figure 6:
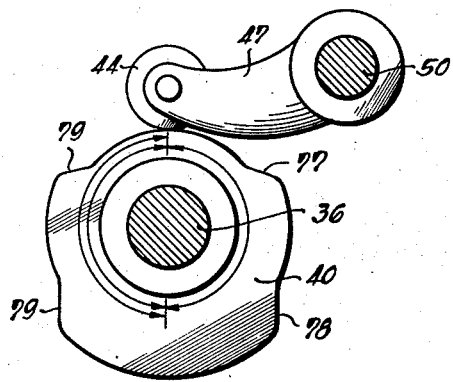
Figure 6 is a side view of a further control cam for gear shifting as seen in the direction of the arrow V in Figure 1.

The control cams are shown in an illustrative form in Figures 5 to 7. In this form, the cams 37 and 40 according to Figures 5 and 6 serve for gear shifting while the clutch control of the vehicle is effected through the cam 41 of Figure 7 in connection with the operation of the accelerator. In connection with the accelerator there is provided a linkage which effects a retardation or delay during the transfer of the gear movement from the clutch or vehicle coupling to the fuel throttle valve.

Figure 9:
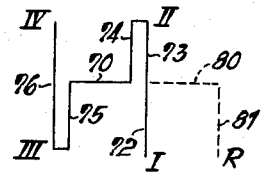
Figure 9 is a schematic representation of the movement of the gear lever during the gear change of a power driven vehicle.

Figure 9 schematically represents the course of movement of a usual gear shift lever of a power driven vehicle in which the position of the individual gears is indicated with roman numbers. It will be clear that the gear shift lever has movements in perpendicular directions. The first of these movements, namely that corresponding to the line 70, is effected by the cam 37 and thus by means of the cam surface 71. The movements running perpendicular to the line 70, namely, 72 to the first gear, 73 to the second gear, 74 to the neutral position, 75 to third gear are effected by the cam surfaces 77, 78 and 79 while the other gear shift motions corresponding to the line 76 are effected by the surfaces 77 and 78 because as previously mentioned the cam 40 undergoes a one and a half turn rotation while the cam 37 experiences only a turn through an angle corresponding to the arrow 42.

The change into reverse position can be easily effected by hand because the movement is from one position of the cams 37, 40 or the rollers 43, 44 running thereon wherein these rollers are in their lowermost position, so that they can easily be lifted. It is in this way that the roller 43 is first lifted on displacement of the gear shift lever corresponding to the line 80 (Fig. 9). The roller 44 is initially lifted by a return movement of the gear shift lever from the first gear corresponding to the line 72 and is then moving as represented by line 81 after movement of the gear lever corresponding to line 80 (Fig. 9), is further returned to the cam 40. If the turning speed of the shaft 3 exceeds the turning speed for effecting the gear shift then the reversing step is automatically released in that the gear lever is uncoupled by the turning of the cam 40 corresponding to the line 81 (Fig. 9).

The invention further provides special means whereby the automatic operation of the gears can be immediately prevented in special cases, for example during passing. For this purpose an adjustable stop member 82 is provided in the housing 1 which co-operates with a counterlock 83 which is fixed to a part 58 which is axially movable with the shaft 3. The member 82 and the counterlock 83 are so formed that they engage when the member 82 is pressed in. For example the member 82 can be so connected with the accelerator of the vehicle that the lock member will engage when the accelerator is completely depressed and thus the counterlock 83 and the shaft 3 are held in their middle positions. Clearly no gear shift movement can then take place.

Provisions for manual shifting are also provided. For manual operation the control cams must be in the position corresponding to third gear. In this position the friction wheel 8 is withdrawn from the driving belt of the vehicle motor.

For the purpose of illustration the device has been shown and described in connection with a four position gear transmission. It will be clear however that the device is also applicable for other gears with corresponding alterations of the control cams.

What I claim is:

1. A mechanism for automatic gear shifting of a transmission, especially for automotive vehicles, comprising in combination, a main casing, a driving shaft rotatably and axially movably mounted within said casing, regulating means for axially moving said driving shaft in dependence on the speed of rotation thereof, resilient means counteracting said regulating means, a driven shaft axially aligned with said driving shaft mounted rotatably and axially movably with said driving shaft within said casing, a first clutch member mounted on said driving shaft, a second clutch member fixedly connected with said driven shaft and forming a part of a reversible gear adapted to engage said first clutch member on moving said driving shaft in one direction, a third clutch member forming a part of said reversible gear adapted to engage said first clutch member on moving said driving shaft in the other direction and rotating said driven shaft in a reverse direction relative to said driving shaft, axially spaced means for stopping the axial movement of said driven shaft in both directions and means for drivingly connecting said driven shaft with the shifting means of the transmission.

2. A mechanism for automatic gear shifting of a transmission, especially for automotive vehicles, comprising in combination, a main casing, a driving shaft rotatably and axially movably mounted within said casing, regulating means for axially moving said driving shaft in dependence on the speed of rotation thereof, resilient means counteracting said regulating means, a driven shaft axially aligned with said driving shaft mounted rotatably and axially movably with said driving shaft within said casing, a first clutch member mounted on said driving shaft, a second clutch member fixedly connected with said driven shaft and forming a part of a reversible gear adapted to engage said first clutch member on moving said driving shaft in one direction, a third clutch member forming a part of said reversible gear adapted to engage said first clutch member on moving said driving shaft in the other direction and rotating said driven shaft in a reverse direction relative to said driving shaft, axially spaced means for stopping the axial movement of said driven shaft in both directions, at least one control shaft arranged in parallel relationship to said driving and said driven shaft, a worm fixed to said driven shaft meshing with a wormwheel having driving connection with said control shaft, and actuating means for drivingly connecting said control shaft with the shifting means of the transmission.

3. A mechanism for automatic gear shifting of a transmission, especially for automotive vehicles, comprising in combination, a main casing, a driving shaft rotatably and axially movably mounted within said casing, regulating means for axially moving said driving shaft in dependence on the speed of rotation thereof, resilient means counteracting said regulating means, a driven shaft axially aligned with said driving shaft mounted rotatably and axially movably with said driving shaft within said casing, a first clutch member mounted on said driving shaft, a second clutch member fixedly connected with said driven shaft and forming a first friction wheel of a reversible gear adapted to engage said first clutch member on moving said driving shaft in one direction, a third clutch member idling on said driving shaft and forming a second friction wheel of said reversible gear adapted to engage said first clutch member on moving said driving shaft in the other direction, said first and second friction wheel being drivingly connected by at least one pinion, a wheel rotatable about an axis perpendicular to the axis of said friction wheels, said reversible gear being arranged within a housing which is movably supported in axial direction of said driving and driven shaft, at least one control shaft arranged in parallel relationship to said driving and said driven shaft, a worm fixed to said driven shaft meshing with a wormwheel having driving connection with said control shaft, two axially spaced stop members provided on said reversible gear housing, an abutment disc element fastened on said control shaft and arranged between said stop members, and means for drivably connecting said control shaft to the shifting means of the transmission.

4. A mechanism for automatic gear shifting of a transmission, especially for automotive vehicles, comprising in combination, a main casing, a driving shaft rotatably and axially movably mounted within said casing, regulating means for axially moving said driving shaft in dependence on the speed of rotation thereof, resilient means counteracting said regulating means, a driven shaft axially aligned with said driving shaft mounted rotatably and axially movably with said driving shaft within said casing, a first clutch member mounted on said driving shaft, a second clutch member fixedly connected with said driven shaft and forming a first friction wheel of a reversible gear adapted to engage said first clutch member on moving said driving shaft in one direction, a third clutch member idling on said driving shaft and forming a second friction wheel of said reversible gear adapted to engage said first clutch member on moving said driving shaft in the other direction, said first and second friction wheel being drivingly connected by at least one pinion, a wheel rotatable about an axis perpendicular to the axis of said friction wheels, said reversible gear being arranged within a housing which is movably supported in axial direction of said driving and driven shaft, first and second control shafts arranged in parallel relationship to said driving and said driven shaft, a worm fixed to said driven shaft meshing with a wormwheel having driving connections with said first and second control shafts, two axially spaced stop members provided on said housing, an abutment disc element connected to said first control shaft and arranged between said stop members, a catch element radially projecting from said driving shaft and movable together therewith, a locking disc member connected to said first control shaft and provided with a plurality of circumferential recesses adapted to receive said catch member and means for drivably connecting said first control shaft with a first shifting lever of the transmission for moving said first actuating lever in a first direction.

5. A mechanism as claimed in claim 4, characterized in that said wormwheel is fixedly mounted on an intermediary shaft, said shaft carrying a worm meshing with a wormwheel arranged on said first control shaft and a wormwheel arranged on said second control shaft.

6. A mechanism as claimed in claim 4, characterized in that an opening is provided in said abutment disc element adapted to receive one or the other of said stop members, said opening and said stop members lying substantially on the same radius with respect to the rotational axis of said abutment disc element and circumferentially in the standstill position between said stop member.

7. A mechanism as claimed in claim 4, characterized in that two of said recesses of said locking disc member correspond to the end positions of said locking disc member while the number and position of the remaining part of said recesses correspond to the gear steps to be controlled.

8. A mechanism as claimed in claim 4, characterized in that said recesses and said catch member have oblique flanks.

9. A mechanism as claimed in claim 4 having in combination limiting elements for limiting the axial movement of said driving shaft caused by said regulating means.

10. A mechanism as claimed in claim 4 characterized in that said first clutch member is axially displaceable on said driving shaft, and that spring means are provided for holding said clutch member in an intermediate axial position.

11. A mechanism as claimed in claim 4 characterized in that said locking disc member is rotatably supported on said first control shaft, and that a supporting member is fastened on said first control shaft, and that means are provided for resiliently supporting said locking disc member against said supporting member towards both circumferential directions.

References Cited in the file of this patent

UNITED STATES PATENTS

| | | |
|---|---|---|
| 1,273,266 | Patch | July 23, 1918 |
| 1,791,593 | Hantschel et al. | Feb. 10, 1931 |